(12) United States Patent
Chou (10) Patent No.: US 10,129,774 B2
(45) Date of Patent: Nov. 13, 2018

(54) METHODS AND APPARATUSES OF WLAN ALARM NOTIFICATION IN CELLULAR NETWORKS

(71) Applicant: Intel IP Corporation, Santa Clara, CA (US)

(72) Inventor: Joey Chou, Scottsdale, AZ (US)

(73) Assignee: Intel IP Corporation, Santa Clara, CA (US)

( * ) Notice: Subject to any disclaimer, the term of this patent is extended or adjusted under 35 U.S.C. 154(b) by 24 days.

(21) Appl. No.: 14/668,663

(22) Filed: Mar. 25, 2015

(65) Prior Publication Data

US 2016/0105809 A1 Apr. 14, 2016

Related U.S. Application Data

(60) Provisional application No. 62/062,711, filed on Oct. 10, 2014.

(51) Int. Cl.
*H04W 24/04* (2009.01)
*H04L 12/24* (2006.01)

(52) U.S. Cl.
CPC ......... *H04W 24/04* (2013.01); *H04L 41/0226* (2013.01); *H04L 41/0686* (2013.01); *H04L 41/0233* (2013.01)

(58) Field of Classification Search
CPC ............... H04W 24/04; H04L 41/0226; H04L 41/0686; H04L 41/0233
See application file for complete search history.

(56) References Cited

U.S. PATENT DOCUMENTS

| 6,697,970 B1* | 2/2004 | Chisholm ........... H04L 41/0213 714/48 |
| 9,413,615 B1* | 8/2016 | Singh ...................... H04L 41/22 |
| 9,516,558 B2 | 12/2016 | Chou | |
| 2005/0002407 A1 | 1/2005 | Shaheen et al. | |
| 2005/0108558 A1 | 5/2005 | Hanebutte | |
| 2007/0174449 A1* | 7/2007 | Gupta ................... H04L 41/147 709/224 |
| 2008/0253314 A1 | 10/2008 | Stephenson et al. | |

(Continued)

FOREIGN PATENT DOCUMENTS

| CN | 102857971 A | 1/2013 |
| CN | 105340221 A | 2/2016 |

(Continued)

OTHER PUBLICATIONS

3GPP TS 32.111-2 v10.1.0, 3GPP, 2011.*

(Continued)

*Primary Examiner* — Habte Mered
(74) *Attorney, Agent, or Firm* — Schwabe, Williamson & Wyatt, P.C.

(57) ABSTRACT

Embodiments of the present disclosure describe systems, devices, and methods for wireless local area network alarm notifications in cellular networks. Various embodiments may include an integration reference point agent in an element manager that receives an alarm notification according to a first format from an access point, converts the alarm notification to a second format, and send the converted alarm notification to an integration reference point manager. Other embodiments may be described or claimed.

30 Claims, 7 Drawing Sheets

(56) References Cited

U.S. PATENT DOCUMENTS

| | | | |
|---|---|---|---|
| 2009/0254606 A1* | 10/2009 | Power | H04L 12/24 709/203 |
| 2010/0087189 A1 | 4/2010 | Shaheen et al. | |
| 2010/0141421 A1* | 6/2010 | Lagnelov | G05B 23/0267 340/506 |
| 2011/0010654 A1* | 1/2011 | Raymond | G06N 5/025 715/772 |
| 2011/0280157 A1* | 11/2011 | Suerbaum | H04L 41/0663 370/255 |
| 2012/0059923 A1 | 3/2012 | Cleary et al. | |
| 2012/0287773 A1* | 11/2012 | Zang | H04L 41/06 370/216 |
| 2013/0088983 A1 | 4/2013 | Pragada et al. | |
| 2013/0242783 A1 | 9/2013 | Horn et al. | |
| 2014/0092742 A1 | 4/2014 | Chou | |
| 2014/0105060 A1 | 4/2014 | Baillargeon | |
| 2015/0257024 A1 | 9/2015 | Bald et al. | |
| 2016/0044660 A1 | 2/2016 | Chou | |
| 2016/0092537 A1* | 3/2016 | Vieira | G06F 17/30575 707/634 |
| 2017/0041827 A1 | 2/2017 | Chou | |

FOREIGN PATENT DOCUMENTS

| | | |
|---|---|---|
| EP | 2997696 A1 | 3/2016 |
| KR | 20120048932 A | 5/2012 |
| RU | 2138129 C1 | 9/1999 |
| TW | 201707501 A | 2/2017 |
| WO | 2011073499 A1 | 6/2011 |
| WO | 2012062373 A1 | 5/2012 |
| WO | WO 2013/067464 A1 | 5/2013 |
| WO | 2013095990 A1 | 6/2013 |
| WO | 2014052129 A1 | 4/2014 |
| WO | WO 2014/186055 A1 | 11/2014 |

OTHER PUBLICATIONS

3GPP TR 32.841 v12.0.0 (Sep. 2014).*
Taiwan Office Action issued for Taiwan Application No. 104129203 dated Aug. 18, 2016; 16 pages.
3GPP, "Technical Specification Group Services and System Aspects; Telecommunication Management; Fault Management; Part 2: Alarm Integration Reference Point (IRP); Information Service (IS) (Release 12)," TS 32.111-2 V12.0.0 (Oct. 2014); 68 pages.
3GPP, "Technical Specification Group Services and System Aspects; Telecommunication Management; Study on Wireless Local Area Network (WLAN) Management (Release 12)," TR 32.841 V12.0.0 (Sep. 2014); 13 pages.
Intel, "Discussion paper of IRP selection study," Document for discussion and approval; 6.8.1—TR on WLAN impacts to Type-2 management (560036); 3GPP TSG SA WG5 (Telecom management) Meeting #91; Oct. 14-18, 2013; Shenzhen, P.R. China; S5-131607; 3 pages.
International Search Report and Written Opinion for PCT/US2015/042068 dated Oct. 9, 2015; 12 pages.
3GPP, "Generic Network Resource Model (NRM) Integration Reference Point (IRP); Information Service (IS) (Release 11)," 3GPP TS 28.622 V11.0.0 (Dec. 2012), Dec. 21, 2012, Lte Advanced, 22 pages.
3GPP, "Fault Management; Part 2: Alarm Integration Reference Point (IRP): Information Service (IS) (Release 12)," 3GPP TS 32.111-2 V12.0.0 (Oct. 2014), Oct. 2, 2014, Lte Advanced, 68 pages.
3GPP, "Configuration Management (CM); Generic network resources Integration Reference Point (IRP); Network Resource Model (NRM) (Release 11)," 3GPP TS 32.622 V11.1.0 (Jun. 2013), Jun. 28, 2013, Lte Advanced, 29 pages.
McCloghrie et al., "The Interfaces Group MIB," Network Working Group, Category: Request for Comments: 2863, Obsoletes: 2233, Category: Standards Track, Jun. 2000, 69 pages.

Chisholm et al., "Alarm Management Information Base (MIB)," Network Working Group, Category: Request for Comments: 3877, Category: Standards Track, Sep. 2004, 75 pages.
3GPP, "Study on Wireless Local Area Network (WLAN) management (Release 12)," 3GPP TR 32.841 V12.0.0 (Sep. 2014), Sep. 29, 2014, Lte Advanced, 12 pages.
3GPP, "Wireless Local Area Network (WLAN) Management Concepts and requirements (Release 12)," 3GPP TS 28.680 V0.2.0 (May 2014), Jun. 27, 2014, Lte Advanced, 8 pages.
International Search Report and Written Opinion dated Aug. 14, 2014 from International Application No. PCT/US2014/031767.
3GPP, "Principles and high level requirements (Release 11)," 3GPP TS 32.101 V11.1.0 (Dec. 2012), Dec. 21, 2012, Lte Advanced, 67 pages.
3GPP, "Wireless Local Area Network (WLAN) Management Network Resources Model (NRM) Integration Reference Point (IRP); Information Service (IS) (Release 12)," 3GPP TS 28.682 V0.0.0 (Nov. 2013), Jan. 14, 2014, lte advanced, 8 pages.
3GPP TR 32.841 V0.4.0 (May 2013); "Technical Specification Group Services and System Aspects; Telecommunication Management; Study on WLAN Management (Release 12)," 11 pages.
European Patent Office; Extended European Search Report dated Dec. 13, 2016 for Patent Application No. 14797776.3; 9 pages.
Intel; "Text proposal to WLAN management TR," 3GPP TSG SA WG5 (Telecom Management) Meeting #84, S5-121724; Agenda Item: 6.8.1—TR on WLAN impacts to Type-2 management (560036); Aug. 20-24, 2012; Berlin Germany; 4 pages.
Japan Patent Office; Office Action dated Dec. 6, 2016 for Patent Application No. 2016-511737; 6 pages.
Twaian Patent Office; First Office Action dated Jul. 21, 2015 for Patent Application No. 103115176; 31 pages.
Twaian Patent Office; Second Office Action dated Nov. 26, 2015 for Patent Application No. 103115176; 4 pages.
U.S. Patent Office; Office Action dated Dec. 30, 2016 for U.S. Appl. No. 14/779,548; 26 pages.
Intel; "pCR WLAN management mapping function," 3GPP TSG SA WG5 (Telecom Management) Meeting #88, S5-130793; Agenda Item: 6.8.1—TR on WLAN impacts to Type-2 management (560036); Apr. 15-19, 2013; Qingdao, China; 3 pages.
Office Action dated Aug. 22, 2017 from Japanese Patent Application No. 62016-511737, 6 pages.
Final Office Action dated Aug. 11, 2017 from U.S. Appl. No. 14/779,548, 22 pages.
Intel, "Discussion paper of IRP selection study," 3GPP TSG SA WG5 (Telecom Management) Meeting 91, S5-131607, Oct. 14-18, 2013, Shenzhen, P.R. China, 3 pages.
Ericsson, "Use Alarm IRP for WLAN FM," 3GPP TSG SA WG4 (Telecom Management), Meeting 90, S5-131285, Aug. 26-30, 2013, Valencia, Spain, 3 pages.
Search Report dated Aug. 15, 2017 from Taiwan Divisional Application No. 105144235, 3 pages (Translated).
Taiwan Patent Office—Office Action dated Mar. 21, 2018 from Taiwan Divisional Application No. 105115804, 10 pages.
3GPP, "Technical Specification Group Services and System Aspects; Telecommunication management; Performance Management (PM); Concept and requirements (Release 11)," 3GPP TS 32.401 V11.0.0 (Sep. 2012), Lte Advanced, 29 pages.
Examination Report dated Nov. 28, 2017 from Australian Patent Application No. 2015328644, 3 pages.
Russian Patent Office—Office Action dated Mar. 23, 2018 from Russian Patent Application No. 2017107800, 10 pages.
Japanese Patent Office—Office Action dated Apr. 17, 2018 from Japanese Patent Application No. 2017-516902, 16 pages.
3GPP, "TR 32.841 Study on WLAN management, Version 2.0.0," 3GPP TSG SA Meeting #65, TD SP-140548, Agenda Item: 12.50, Sep. 15-17, 2014, Edinburgh, Scotland, 3GPP TSG SA WG5 (Telecom Management) Meeting #96, S5-144434, Aug. 18-22, 2014, Sophia Antipolis, France, 3GPP TR 32.841 V2.0.0 (Sep. 2014), Telecommunication management, Study on WLAN management (Release 12), 14 pages.
Office Action dated Jun. 12, 2018 for Korean Patent Application No. 2017-7005560, 12 pages.

(56) References Cited

OTHER PUBLICATIONS

3GPP, "3rd Generation Partnership Project; Technical Specification Group Services and System Aspects; Telecommunication management; Fault Management; Part 2: Alarm Integration Reference Point (IRP): Inforamation Service (IS) (Release 10)," 3GPP TS 32.111-2 V10.1.0 (Mar, 2011), Mar. 2011, 64 pages.

* cited by examiner

METHODS AND APPARATUSES OF WLAN ALARM NOTIFICATION IN CELLULAR NETWORKS

CROSS-REFERENCE TO RELATED APPLICATION

This application claims the benefit of U.S. Provisional Application No. 62/062,711 filed Oct. 10, 2014, entitled "Method and Apparatus of WLAN Alarm Notifications for WLAN Offloading in 3GPP Cellular Networks," the entirety of which is hereby incorporated herein by reference.

FIELD

Embodiments of the present disclosure generally relate to the field of wireless communication, and more particularly, to methods and apparatuses for wireless local area network alarm notifications in cellular networks.

BACKGROUND

Wireless local area network (WLAN) offloading is becoming a compelling solution for operators to cope with rapid growth of mobile data traffic without the need of network upgrades or expansions. Effective communication between WLAN and cellular network components may facilitate WLAN complementing cellular technology in such a manner.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for WLAN alarm notification in cellular networks.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrases "A or B," "A/B," and "A and/or B" mean (A), (B), or (A and B).

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

Figure 1:
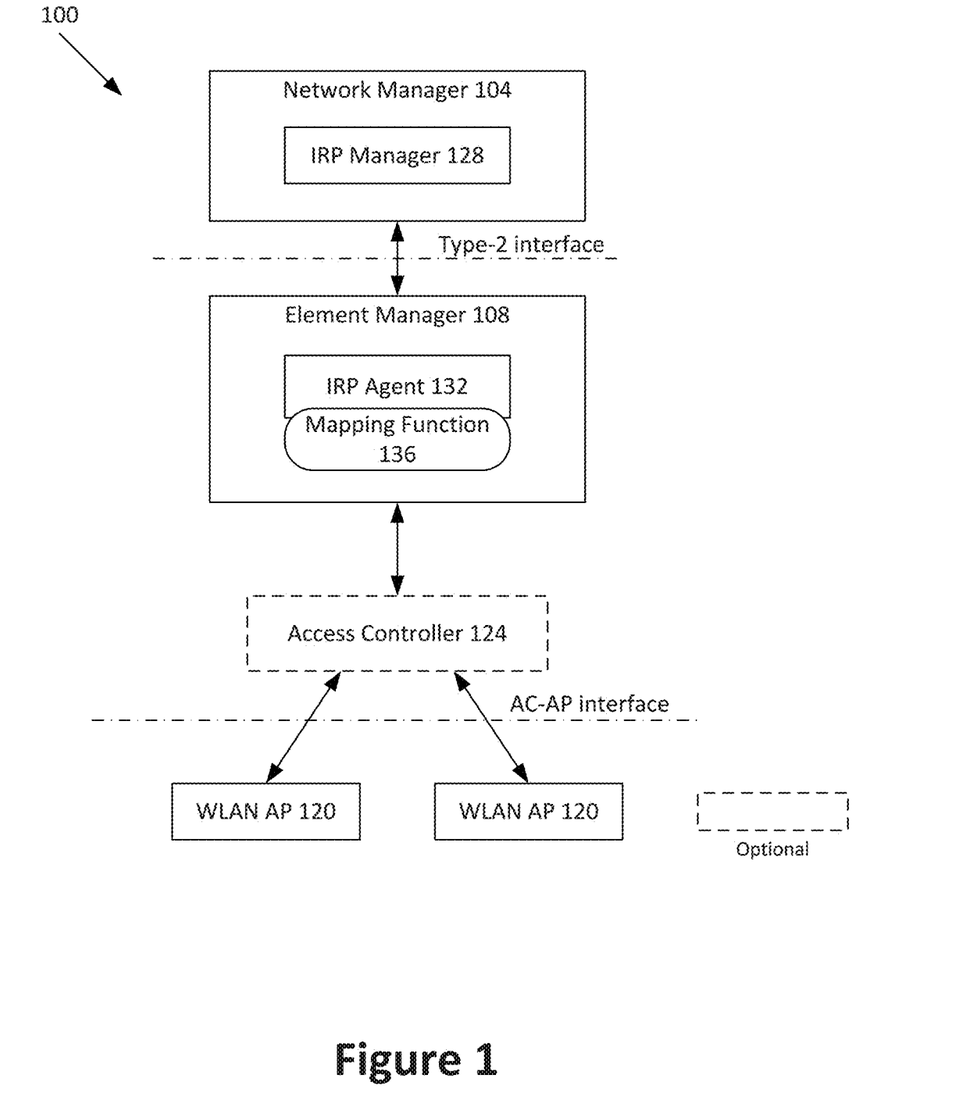
FIG. 1 illustrates a high-level example of a network environment in accordance with various embodiments.

FIG. 1 schematically illustrates a network environment 100 in accordance with various embodiments. The network environment 100 includes a network manager 104 communicatively coupled with an element manager 108. The network manager 104 may manage a plurality of element managers including one or more element managers in addition to the element manager 108. The network manager 104 and element manager 108 may be part of a cellular network such as a 3GPP LTE Advanced (LTE-A) network. In other embodiments, other cellular network technologies may be utilized.

In various embodiments, the WLAN APs 120 may be communicatively coupled with the element manager 108. In some embodiments, the network environment 100 may further include an access controller 124 to manage one or more WLAN APs 120 over an AC-AP interface. In these embodiments, the element manager 108 may communicate with the one or more WLAN APs 120 via the access controller 124. Other embodiments may not include the access controller 124. In these embodiments, the element manager 108 may communicate directly with the WLAN APs 120.

In various embodiments, the network manager 104 may include an integration reference point (IRP) manager 128 to manage a plurality of element managers, including element manager 108, of the LTE-A network. The IRP manager 128 may communicate with the element manager 108 via a wired and/or wireless interface. In some embodiments, the IRP manager 128 may communicate with the element manager 108 over a Type-2 interface that is associated with network management protocols (and associated network management data) whose characteristics are defined by 3GPP Technical Specifications. In some embodiments, the IRP manager 128 may be included in and/or implemented by a chip, chipset, or other collection of programmed and/or preconfigured circuitry.

In various embodiments, the element manager 108 may include an IRP agent 132. The IRP agent 132 may communicate with the IRP manager 128 of the network manager 104 (for example, via the Type-2 interface). In some embodiments, the IRP agent 132 and/or mapping function 136 may be included in and/or implemented by a chip, chipset, or other collection of programmed and/or preconfigured circuitry.

The IRP manager 128 and IRP agent 132 may perform a number of IRP functions in the network environment 100 including, but not limited to, fault and configuration management operations. Embodiments of the present disclosure describe, in particular, fault management operations performed by the IRP components.

In various embodiments, the IRP agent 132 may implement the mapping function 136 to convert management data, for example, alert notifications, between a first format generated and/or used by the WLAN APs 120 of the WLAN to a second format that is used by the IRP manager 128 of the network manager 104 that manages the LTE-A network. For example, the IRP agent 132 may receive alert notifications from the WLAN AP 120 in accordance with the first format, and the IRP agent 132, along with the mapping function 136, may convert the alert notifications from the first format to the second format. The IRP agent 132 may then send the alarm notifications, in the second format, to the network manager 104 (for example, to the IRP manager 128 of the network manager 104).

In some embodiments, the first format in which the alert notifications are received from the WLAN AP 120 may be a standardized Internet format such as, but not limited to, an Internet Engineering Task Force (IETF) format. The second format in which the alert notifications are transmitted to the IRP manager 128 may be a cellular standards format such as, but not limited to, a 3GPP format. In some embodiments, the alert notifications in the second format may be compatible with those defined in 3GPP TS 32.111-2, Rel V12.0.0 (Upload date 2014 Oct. 2).

The IRP agent 132 and the mapping function 136 may allow the network manager 104 and/or element manager 108 to retrieve alert notifications (and other data) from the WLAN APs 120. The network manager 104 and/or element manager 108 may use the alert notifications from the WLAN APs 120 to manage the LTE-A network. For example, the alarm may indicate an operating status of the WLAN AP to indicate if a network connection is available via the WLAN AP 120 (for example, whether or not the WLAN AP 120 is able to pass data packets). For example, in some embodiments, the alarm may include an ifOperStatus object managed by the WLAN AP 120 to indicate an operational status of an interface associated with the WLAN AP 120. The interface associated with the WLAN AP 120 may refer to a communication interface that may be used to pass data/control packets from/to the WLAN AP 120.

The ifOperStatus object may be an object such as that described by IETF RFC 2863 (2000). The WLAN AP 120 may embed the ifOperStatus object in a linkUp/linkDown notification to report various WLAN AP alarms. Examples of alarms based on linkUp/linkDown notifications, similar to those described in IETF RFC 3877 (2004), are shown below.

```
linkDown NOTIFICATION-TYPE
       OBJECTS { ifIndex, ifAdminStatus, ifOperStatus }
       STATUS current
       DESCRIPTION
           ""
```

```
    ::= { snmpTraps 3 }
linkUp NOTIFICATION-TYPE
       OBJECTS { ifIndex, ifAdminStatus, ifOperStatus }
       STATUS current
       DESCRIPTION
           ""
    ::= { snmpTraps 4 }"
alarmModelIndex            3
alarmModelState            1
alarmModelNotificationId       linkUp
alarmModelVarbindIndex     0
alarmModelVarbindValue     0
alarmModelDescription      "linkUp"
alarmModelSpecificPointer      ituAlarmEntry.3.1
alarmModelVarbindSubtree       ifIndex (1.3.6.1.2.1.2.2.1.1)
alarmModelResourcePrefix   0.0
alarmModelRowStatus        active (1)
ituAlarmEventType          communicationsAlarm (2)
ituAlarmPerceivedSeverity      cleared (1)
ituAlarmGenericModel       alarmModelEntry.3.1
alarmModelIndex            3
alarmModelState            3
alarmModelNotificationId       linkDown
alarmModelVarbindIndex     2
alarmModelVarbindValue     up (1)
alarmModelDescription      "linkDown - confirmed problem"
alarmModelSpecificPointer      ituAlarmEntry.3.3
alarmModelVarbindSubtree       ifIndex (1.3.6.1.2.1.2.2.1.1)
alarmModelResourcePrefix   0.0
alarmModelRowStatus        active (1)
ituAlarmEventType          communicationsAlarm (2)
ituAlarmPerceivedSeverity      critical (3)
ituAlarmGenericModel       alarmModelEntry.3.3
```

The WLAN AP 120 may send an alert notification when the ifOperStatus object changes its value. The value of ifOperStatus object may be shown below in accordance with RFC 2863 according to some embodiments.

```
ifOperStatus OBJECT-TYPE
       SYNTAX INTEGER {
               up(1),    -- ready to pass packets
               down(2),
               testing(3),   -- in some test mode
               unknown(4),   -- status can not be determined for
               some reason.
               dormant(5),
               notPresent(6),   -- some component is missing
               lowerLayerDown(7) -- down due to state of lower-
               layer interface(s)
       }
       MAX-ACCESS read-only
       STATUS    current
       DESCRIPTION
           "The current operational state of the interface. The
           testing(3) state indicates that no operational packets can
           be passed. If ifAdminStatus is down(2) then ifOperStatus
           should be down(2). If ifAdminStatus is changed to up(1)
           then ifOperStatus should change to up(1) if the interface is
           ready to transmit and receive network traffic; it should
           change to dormant(5) if the interface is waiting for
           external actions (such as a serial line waiting for an
           incoming connection); it should remain in the down(2) state
           if and only if there is a fault that prevents it from going
           to the up(1) state; it should remain in the notPresent(6)
           state if the interface has missing (typically, hardware)
           components."
    ::= { ifEntry 8 }
```

The lowerLayerDown(7) state may be a type of down state that indicates the interface relies on a lower-level this is down, for example, not operational. The ifAdminStatus may be controlled by an administrator or operator. For example, an administrator may decide to disable a WLAN AP 120 and set the ifAdminStatus to down. In this case, the ifOperStatus may also be down. The administrator may enable the WLAN AP 120 by setting the ifAdminStatus to up. The ifOperStatus may then also be set to up (as long as there are no other issues with the interface that would prevent it from being operational, in which case it would still be down).

Figure 2:
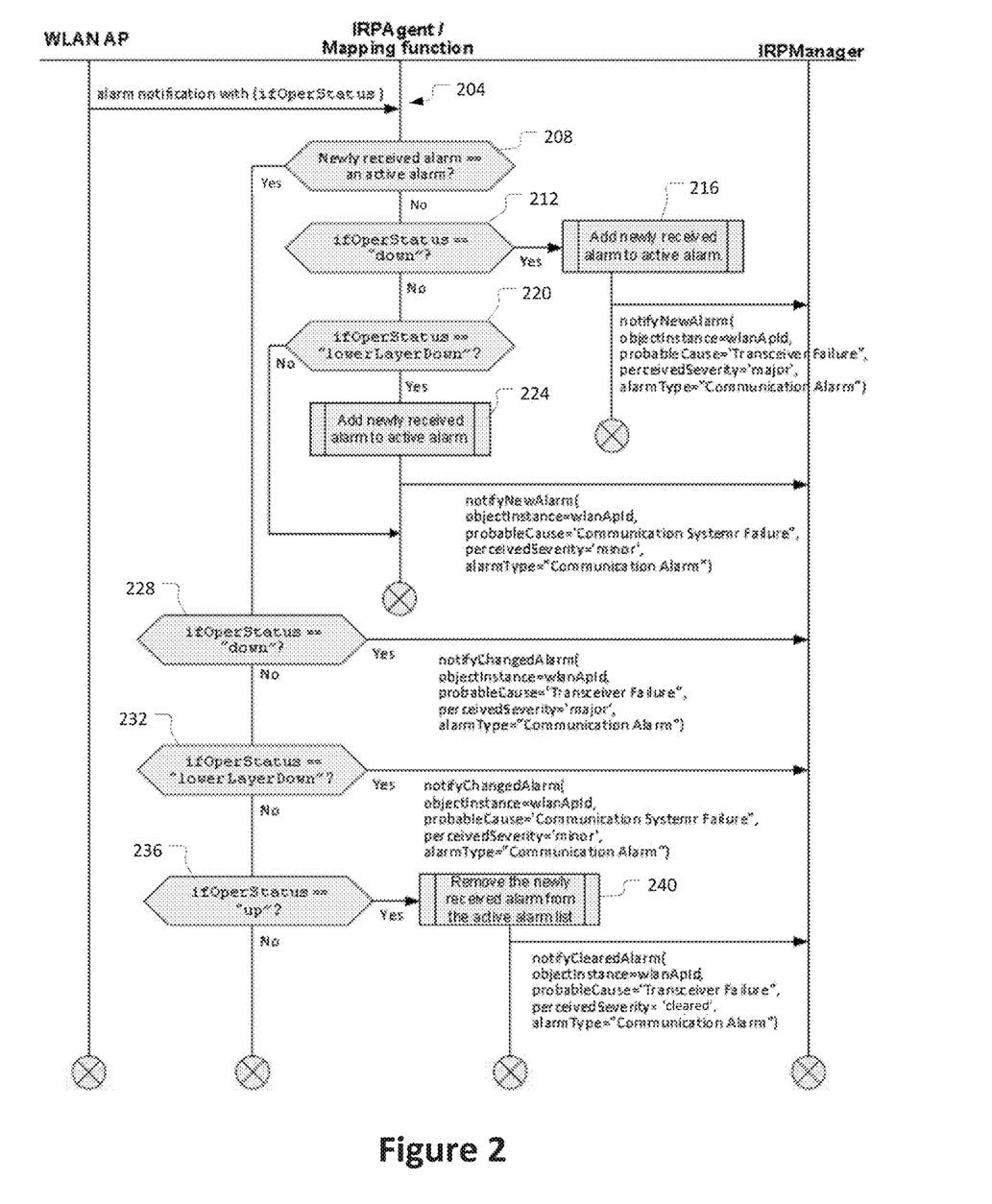
FIG. 2 illustrates a flowchart that describes operation of an integration reference point agent in accordance with various embodiments.

Upon receiving an alert notification from the WLAN AP 120 in a first format, the IRP agent 132 together with the mapping function 136 may map the alert notification to an alert notification in a second format. FIG. 2 illustrates a flowchart that describes operations of the IRP agent 132 in accordance with some embodiments.

As described herein, the IRP agent 132 may perform a number of operations. It may be understood that in the performance of these operations, the IRP agent 132 may access or otherwise utilize the mapping function 136. The mapping function 136 may contain rules or logic, such as that generally illustrated and described in the specification and description language (SDL) diagram of FIG. 2, that facilitate the mapping of alert notifications in a first format to alert notifications in a second format. Thus, in some embodiments, operations described as being performed by the IRP agent 132 may be performed by the IRP agent 132 in conjunction with the mapping function 136.

At 204, the WLAN AP 120 may transmit a WLAN alert notification, including an ifOperStatus object, to the IRP agent 132. At 208, the IRP agent 132 may determine whether the newly received WLAN alarm notification corresponds to an active alarm.

The IRP agent 132 may determine whether the newly received WLAN alarm notification corresponds to an active alarm by checking an alarm list, accessible by the element manager 108, for alarm information that corresponds to the newly received alarm notification. The alarm list may be stored locally at the element manager 108 or may be stored remotely, but available to, the element manager 108. Alarm information may be identified in the alarm list by an alarm ID. In various embodiments the alarm information may be associated with a number of different attributes. For example, alarm information may include a notificationID to identify a notification that carries the alarm information; an alarmRaisedTime to indicate the date and time when an alarm is first raised by an alarmed resource; an alarmChangedTime to indicate the last date and time when the alarm information is changed by the alarmed resource; an alarmClearedTime to indicate the date and time when an alarm is cleared; an eventType, which may also be referred to as alarmType, to indicate the type of event/alarm; a probableCause to qualify an alarm and provide information in addition to the information on event type; a perceivedSeverity to indicate a relative level of urgency for operator attention; etc. In various embodiments, the alarm list may be similar to that described in 3GPP TS 32.111-2.

If, at 208, it is determined that there exists no alarm information in the alarm list that corresponds to the WLAN alarm notification, the IRP agent 132 may generate a converted alarm notification that will indicate a new alarm has been raised by the WLAN AP 120. The parameters of the converted alarm notification may be based on the value of the ifOperStatus object.

For example, at 212, the IRP agent 132 may determine whether the ifOperStatus is equal to down. This may indicate that an operational status of the interface associated with the WLAN AP 120 is down, for example, not operational. The interface may be a communication interface of the WLAN AP 120 that communicates with network components or LTE user equipment (UE).

If the ifOperStatus is equal to down, the IRP agent 132 may, at 216, add alarm information corresponding to the WLAN alarm notification to the alarm list of active alarms. The IRP agent 132 may also generate the converted alarm notification and send the converted alarm notification to the IRP manager 128.

In some embodiments, the converted alarm notification generated after a positive determination at 212 may have a notification type of "notifyNewAlarm"; an object instance that indicates an ID of the WLAN AP 120; a probable cause of "transceiver failure"; a perceived severity as "critical" or "major"; and an alarm type as "communications alarm." A communications alarm type may be associated with the procedure and/or process that involves the conveying of information from one point to another. The alarm notification having a notification type of "notifyNewAlarm," which may also be simply referred to as a notifyNewAlarm notification, may notify the IRP manager 128 of the presence of a new alarm with respect to the interface associated with the WLAN AP 120.

If, at 212, the IRP agent 132 determines that the ifOperStatus is not equal to down, the process may advance to 220 where the IRP agent 132 may determine whether the ifOperStatus is equal to lowerLayerDown, which may indicate that a lower layer upon which the interface may depend is not operational.

If, at 220, the IRP agent 132 determines that the ifOperStatus is equal to lowerLayerDown, the IRP agent 132 may, at 226, add alarm information corresponding to the WLAN alarm notification to the alarm list of active alarms. The IRP agent 132 may also generate the converted alarm notification and send the converted alarm notification to the IRP manager 128. In this instance, the converted alarm notification may be a notifyNewAlarm notification that has an object instance that indicates an ID of the WLAN AP 120; a probable cause of "communication system failure"; a perceived severity as "minor"; and an alarm type as "communications alarm."

If, at 208, the IRP agent 132 determines that the newly received alarm notification is equal to an active alarm, the process may advance to 228. At 228, the IRP agent 132 may determine whether the ifOperStatus is equal to down. If so, the IRP agent 132 may update the alarm information in the alarm list and generate a converted alarm notification having a notification type of "notifyChangedAlarm," which may also be referred to as a notifyChangedAlarm notification, to indicate an alarm has been changed but not yet cleared. The notifyChangedAlarm notification may include an object instance that indicates an ID of the WLAN AP 120; a probable cause of "transceiver failure"; a perceived severity as "major" or "critical"; and an alarm type as "communications alarm." The IRP agent 132 may then send the notifyChangedAlarm notification to the IRP manager 128.

If, at 228, the IRP agent 132 determines that the ifOperStatus is not equal to down(2), the process may advance to 232. At 232, the IRP agent 132 may determine whether the ifOperStatus is equal to lowerLayerDown. If so, the IRP agent 132 may update the alarm information in the alarm list and generate a notifyChangedAlarm notification having an object instance that indicates an ID of the WLAN AP 120; a probable cause of "communication system failure"; a perceived severity as "minor"; and an alarm type as "communications alarm." The IRP agent 132 may then send the notifyChangedAlarm notification to the IRP manager 128.

If, at 232, the IRP agent 132 determines that the ifOperStatus is not equal to lowerLayerDown, the process may advance to 236. At 236, the IRP agent 132 may determine whether the ifOperStatus is equal to up, which may indicate that the interface has become operational. In this situation, the IRP agent 132 may remove the newly received alarm from the active alarm list at 240 and generate a converted alarm notification having a notification type of "notify-ClearedAlarm," which may be referred to as a notifyClearedAlarm notification. The notifyClearedAlarm notification may include an object instance that indicates an ID of the WLAN AP 120; a probable cause of "transceiver failure"; a perceived severity of "cleared"; and an alarm type of "communication alarm." The IRP agent 132 may then send the converted alarm notification to the IRP manager 128.

If, at 236, the IRP agent 132 determines that the ifOperStatus is not equal to up, the process may end. In this situation, the ifOperStatus may be set to a value that does not correspond to an alarm notification having the second format.

The network resource model (NRM) of the WLAN AP 120 may be defined in a manner recognizable by an operations, administration, and management (OAM) system of a cellular network, for example, a 3GPP network. Providing an appropriate network resource model of the WLAN AP 120 may facilitate communication of network resource information between the IRP agent 132 and the IRP manager 128 for telecommunication network management purposes including, for example, management of converged networks.

In some embodiments, a set of classes, for example, information object classes (IOCs), may encapsulate information relevant for IRP components. An IOC may represent a management aspect of a network resource. It may describe the information that can be passed and/or used in management interfaces. The representations may be technology agnostic software objects. An IOC may have attributes that represents various properties of a class of objects. An IOC may support operations providing network management services and may be invocable on demand for that particular class of objects. An IOC may support notifications that report event occurrences relevant for that class of objects. An IOC may be modeled using the stereotype "class" in unified modeling language (UML) meta-model. An NRM may be a collection of IOCs representing a set of network resources under management.

Figure 3:
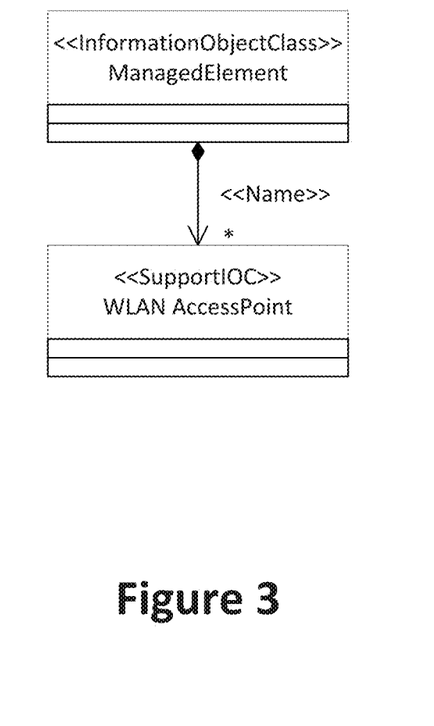
FIG. 3 illustrates a WLAN network resource model containment/naming hierarchy and associations of classes in accordance with various embodiments.

FIG. 3 illustrates a WLAN NRM containment/naming hierarchy and associations of classes 300 in accordance with some embodiments. Thus, the WLAN AP IOC may represent a WLAN AP and may be contained in a ManagedElement IOC as shown in FIG. 3.

Figure 4:
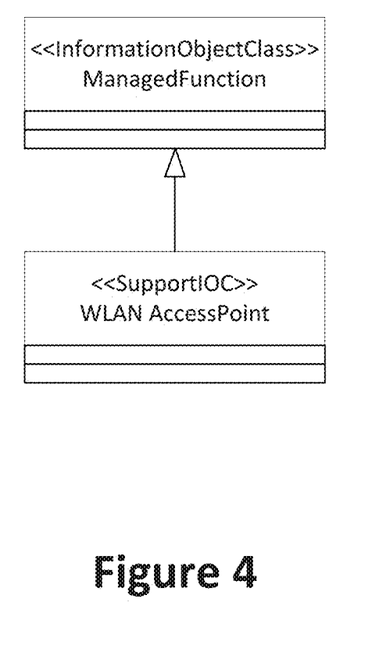
FIG. 4 illustrates a WLAN network resource model inheritance hierarchy in accordance with various embodiments.

FIG. 4 illustrates a WLAN NRM inheritance hierarchy 400 in accordance with various embodiments. The hierarchy 400 may indicate that the WLAN AP IOC may be inherited from ManagedFunction IOC.

The IOC ManagedElement and IOC ManagedFunction of FIGS. 3 and 4 may have elements similar to that described in 3GPP TS 32.622 Rel 11 (2013-06-28) and 3GPP TS 28.622 V11.0.0 (2012-12).

A WLAN access point class may be defined to represent WLAN access point functionality. The class may include attributes such as those shown in table 1.

TABLE 1

| Attribute name | Support Qualifier | isReadable | isWritable | isInvariant | isNotifyable |
|---|---|---|---|---|---|
| wlanApId | M | — | — | — | M |

A set of valid notifications for the WLAN AP identified by wlanApId may include a notifyChangedAlarm, a notifyClearedAlarm, and a notifyNewAlarm. These notifications may be similar to those defined with respect to the alarm IRP in 3GPP TS 32.111-2.

A wlanApID may be an attribute that is present in several IOCs. This attribute may have a "name+value" that can be used as a relative distinguished name (RDN) when naming an instance of the object class. This RDN may uniquely identify the object instance within the scope of its containing, for example, parent, object instance.

Figure 5:
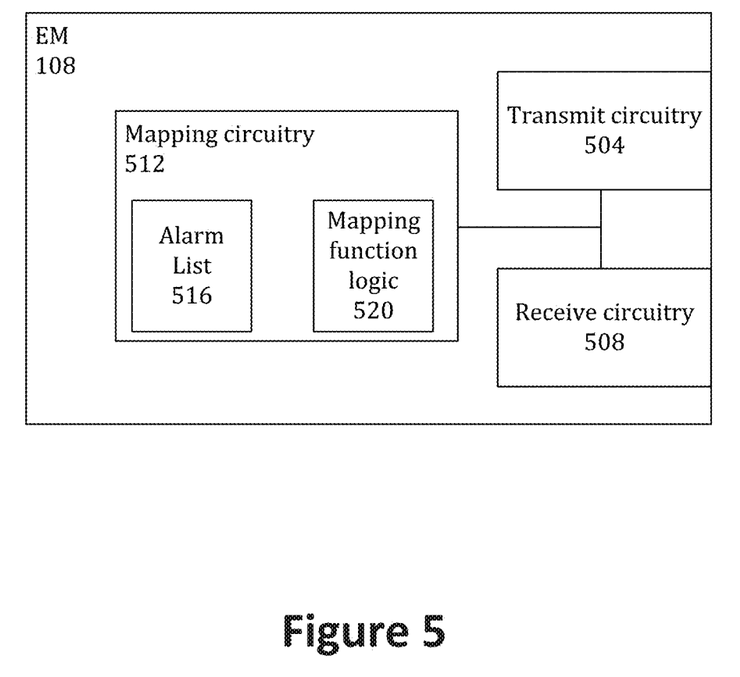
FIG. 5 illustrates an element manager in accordance with various embodiments.

FIG. 5 illustrates the element manager 108 in accordance with various embodiments. The element manager 108 may include transmit circuitry 504 and receive circuitry 508 coupled with mapping circuitry 512.

The transmit circuitry 504 and the receive circuitry 508 may include appropriate circuitry to provide communications over one or more communication interfaces. In some embodiments, the transmit circuitry 504 and the receive circuitry 508 may include circuitry to provide communications over a Type-2 interface, with the network manager 104, and may further include circuitry to provide communication over an interface for communication with the access controller 124 and/or the WLAN AP 120.

The mapping circuitry 512 may provide the functionality previously described with respect to the IRP agent 132 and mapping function 136. The mapping circuitry 512 may access alarm list 516 and mapping function logic 520 to facilitate conversion operations. The alarm list 516 and mapping function logic 520 may reside in storage/memory components of the mapping circuitry 512, as generally shown, or may be accessed remotely, for example, through the transmit circuitry 504 and receive circuitry 508.

Figure 6:
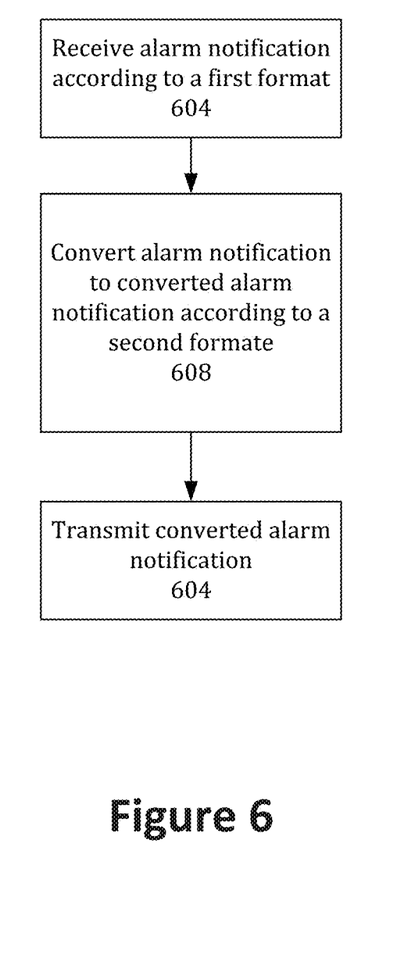
FIG. 6 illustrates a flowchart describing operations of an element manager in accordance with various embodiments.

The components of the element manager 108 may be configured to perform processes such as those illustrated in FIG. 6 and accordance with some embodiments. In particular, the receive circuitry 508 may receive, from the WLAN AP 120, an alarm notification according to a first format at 604. The alarm notification may be provided to the mapping circuitry 512.

At 608, the mapping circuitry 512 may convert the alarm notification from the first format to a converted alarm notification according to a second format to be used by the IRP manager 128, which may manage aspects of an LTE-A network. The mapping circuitry 512 may utilize the alarm list 516 and the mapping function logic 522 to perform the conversion process similar to that described above with respect to the SDL diagram of FIG. 2 in accordance with some embodiments.

At 612, the mapping circuitry 512 may control the transmit circuitry to transmit the converted alarm notification to the IRP manager 128. As described above, the convertible alert notifications may be transmitted to the IRP manager 128 over a Type-2 interface.

Figure 7:
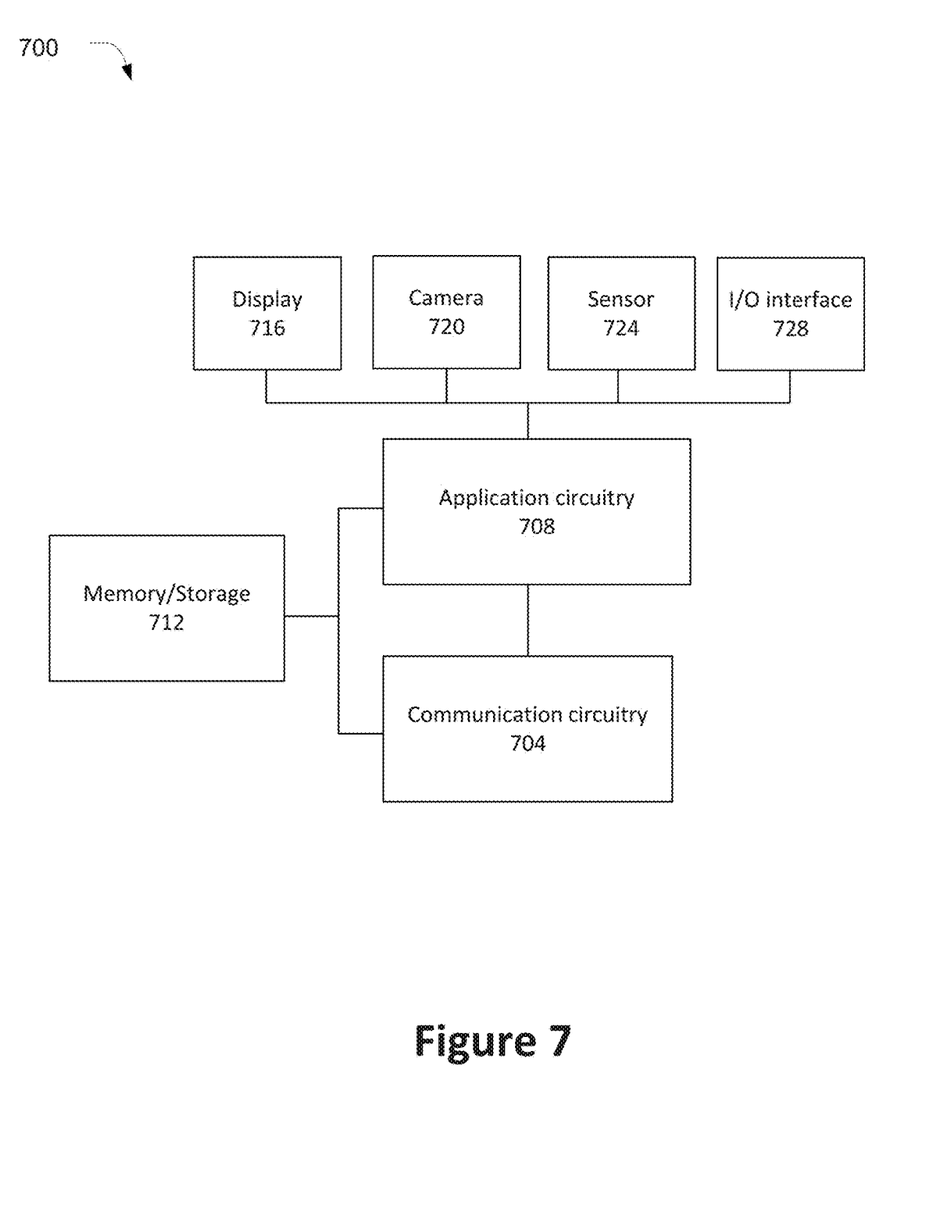
FIG. 7 illustrates an example system that may be used to practice various embodiments described herein.

The network manager 104, element manager 108, WLAN APs 120, and/or access controller 124 described herein may be implemented into a system using any suitable hardware and/or software to configure as desired. FIG. 7 illustrates, for one embodiment, an example system 700 comprising communication circuitry 704, application circuitry 708, memory/storage 712, display 716, camera 720, sensor 724, and input/output (I/O) interface 728, coupled with each other at least as shown. In some embodiments, some or all of the constituent components of the communication circuitry 704, the application circuitry 708, and/or the memory/storage 712 may be implemented together on a system on a chip (SOC).

The application circuitry 708 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 712 and configured to execute instructions and access data stored in the memory/storage to enable various applications and/or operating systems running on the system.

The communication circuitry 704 may include circuitry such as, but not limited to, one or more single-core or multi-core processors and logic circuits to provide signal processing techniques, for example, encoding, modulation, filtering, converting, amplifying, etc., suitable to the appropriate communication interface over which communications will take place. The communication circuitry 704 may communicate over wireline, optical, or wireless communication mediums.

In embodiments in which the system 700 is configured for wireless communication, the communication circuitry 704 may include radio-frequency and baseband circuitry to provide for communication compatible with one or more radio technologies. For example, in some embodiments, the communication circuitry 704 may support communication with an evolved universal terrestrial radio access network (EU-TRAN) and/or other wireless metropolitan area networks (WMAN), a wireless local area network (WLAN), a wireless personal area network (WPAN).

Memory/storage 712 may be used to load and store data and/or instructions, for example, for system. Memory/storage 712 for one embodiment may include any combination of suitable volatile memory (e.g., dynamic random access memory (DRAM)) and/or non-volatile memory (e.g., Flash memory).

In various embodiments, the I/O interface 728 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 724 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the communication circuitry 704 to communicate with components of a positioning network, e.g., a global positioning system (GPS) satellite.

in various embodiments, the camera 720 may include one or more image capturing devices to capture still or video images.

In various embodiments, the display 716 may include a display (e.g., a liquid crystal display, a touch screen display, etc.).

In various embodiments, system may have more or less components, and/or different architectures.

Some non-limiting examples are provided below.

Example 1 include one or more non-transitory, computer-readable media having instructions that, when executed, cause an element manager to: determine a first alarm notification, received from a wireless local area network (WLAN) access point (AP), includes an ifOperStatus object set to indicate that an operational status an interface associated with the WLAN AP is down; determine that the first alarm notification does not correspond to an active alarm in an alarm list stored at the element manager; and generate, based on determination that the first alarm notification includes an ifOperStatus object set to indicate that the operational status is down and determination that the first alarm notification does not correspond to an active alarm, a second alarm notification having a notifyNewAlarm notification type to notify an integration reference point (IRP) manager of a cellular network of a new alarm.

Example 2 includes the one or more non-transitory, computer-readable media of example 1, wherein the instructions, when executed, further cause the element manager to: transmit the second alarm notification to the IRP manager over a Type-2 interface.

Example 3 includes the one or more non-transitory, computer-readable media of example 1 or 2, wherein the instructions, when executed, further cause the element manager to: check an alarm list for alarm information that corresponds to the first alarm notification; and determine that the first alarm notification does not correspond to an active alarm based on said check of the alarm list.

Example 4 includes the one or more non-transitory, computer-readable media of any of examples 1-3, wherein the second alarm notification is to indicate a transceiver failure as probable cause of the operational status.

Example 5 includes the one or more non-transitory, computer-readable media of any of examples 1-4, wherein the second alarm notification is to indicate a perceived severity as critical or major.

Example 6 includes the one or more non-transitory, computer-readable media of any of examples 1-5, wherein the second alarm notification includes an identity of the WLAN AP.

Example 7 includes the one or more non-transitory, computer-readable media of any of examples 1-6, wherein the second alarm notification includes an alarm type of communications alarm.

Example 8 includes the one or more non-transitory, computer-readable media of any of examples 1-7, wherein the second alarm notification comprises a $3^{rd}$ Generation Partnership Project (3GPP) alarm notification.

Example 9 includes an apparatus, for example, an element manager, comprising: receive circuitry to receive, from a wireless local area network (WLAN) access point (AP), an alarm notification according to a first format; mapping circuitry, coupled with the receive circuitry, to convert the alarm notification from the first format to a converted alarm notification according to a second format to be used by an integration reference point (IRP) manager that manages aspects of a cellular network, wherein the converted alarm notification is a notifyNewAlarm notification if the alarm notification includes an ifOperStatus object equal to down and the alarm notification does not match with any existing active alarm at the apparatus; and transmit circuitry, coupled with the mapping circuitry, to transmit the converted alarm notification to the IRP manager.

Example 10 includes the apparatus of example 9, wherein the apparatus comprises an IRP agent and the IRP manager is an IRP manager of a network manager (NM).

Example 11 includes the apparatus of example 9 or 10, wherein the ifOperStatus object equal to down is to indicate an interface associated with the WLAN AP is not operational.

Example 12 includes the apparatus of any of examples 9-11, wherein the mapping circuitry is to add the alarm notification to an active alarm list.

Example 13 includes the apparatus of any of examples 9-12, wherein the transmit circuit is to transmit the converted alarm notification to the IRP manager over a Type-2 interface.

Example 14 includes the apparatus of any of examples 9-13, wherein the converted alarm notification is a notifyClearedAlarm notification if the alarm notification includes an ifOperStatus object equal to up and the alarm notification matches an existing active alarm at the apparatus.

Example 15 includes the apparatus of example 14, wherein the mapping circuitry is to remove, from an alarm list, alarm information corresponding to the alarm notification if the alarm notification includes the ifOperStatus object equal to up.

Example 16 includes the apparatus of any of examples 9-15, wherein the converted alarm notification is a notifyNewAlarm notification if the alarm notification includes in ifOperStatus object equal to lowerLayerDown and the alarm notification does not match an existing active alarm at the apparatus.

Example 17 includes the apparatus of any of examples 9-16, wherein the converted alarm notification is a notifyChangedAlarm notification if the alarm notification includes an ifOperStatus object equal to down and the alarm notification matches an existing active alarm at the apparatus.

Example 18 includes the apparatus of any of examples 9-17, wherein the converted alarm notification is a notifyChangedAlarm notification if the alarm notification includes an ifOperStatus object equal to lowerLayerDown and the alarm notification matches an existing active alarm at the apparatus.

Example 19 includes one or more non-transitory, computer-readable media having instructions that, when executed, cause an element manager to: determine a first alarm notification, received from a wireless local area network (WLAN) access point (AP), includes an ifOperStatus object set to indicate that an operational status of an interface associated with the WLAN AP is up; determine that the first alarm notification corresponds to an active alarm in an alarm list stored at the element manager; and generate, based on determination that the first alarm notification includes an ifOperStatus object set to indicate that the operational status is up and determination that the first alarm notification corresponds to an active alarm, a second alarm notification having a notifyClearedAlarm notification type to notify an integration reference point (IRP) manager of a cellular network of a changed alarm.

Example 20 includes the one or more non-transitory, computer-readable media of example 19, wherein the instructions, when executed, further cause the element manager to: transmit the second alarm notification to the IRP manager over a Type-2 interface.

Example 21 includes the one or more non-transitory, computer-readable media of example 19 or 20, wherein the instructions, when executed, further cause the element manager to: check an alarm list for alarm information that corresponds to the first alarm notification; and determine that the first alarm notification corresponds to an active alarm based on said check of the alarm list.

Example 22 includes the one or more non-transitory, computer-readable media of example 21, wherein the instructions, when executed, further cause the element manager to remove the alarm information that corresponds to the first alarm notification from the alarm list based on determination that the first alarm notification includes an ifOperStatus object set to indicate that the operational status is up.

Example 23 includes the one or more non-transitory, computer-readable media of any of examples 19-22, wherein the second alarm notification is to indicate a perceived severity as cleared.

Example 24 includes the one or more non-transitory, computer-readable media of any of examples 19-23, wherein the second alarm notification includes an identity of the WLAN AP.

Example 25 includes the one or more non-transitory, computer-readable media of any of examples 19-24, wherein the second alarm notification includes an alarm type of communications alarm.

Example 26 includes a method performed, for example, by an element manager, the method comprising determining a first alarm notification, received from a wireless local area network (WLAN) access point (AP), includes an ifOperStatus object set to indicate that an operational status an interface associated with the WLAN AP is down; determining that the first alarm notification does not correspond to an active alarm in an alarm list stored at the element manager; and generating, based on determination that the first alarm notification includes an ifOperStatus object set to indicate that the operational status is down and determination that the first alarm notification does not correspond to an active alarm, a second alarm notification having a notifyNewAlarm notification type to notify an integration reference point (IRP) manager of a cellular network of a new alarm.

Example 27 includes the method of example 26, further comprising: transmit the second alarm notification to the IRP manager over a Type-2 interface.

Example 28 includes the method of example 26 or 27, further comprising: checking an alarm list for alarm information that corresponds to the first alarm notification; and determining that the first alarm notification does not correspond to an active alarm based on said checking of the alarm list.

Example 29 includes the method of any of examples 26-28, wherein the second alarm notification is to indicate a transceiver failure as probable cause of the operational status.

Example 30 includes the method of any of examples 26-29, wherein the second alarm notification is to indicate a perceived severity as critical or major.

Example 31 includes the method of any of examples 26-30, wherein the second alarm notification includes an identity of the WLAN AP.

Example 32 includes the method of any of examples 26-31, wherein the second alarm notification includes an alarm type of communications alarm.

Example 33 includes the method of any of examples 26-32, wherein the second alarm notification comprises a $3^{rd}$ Generation Partnership Project (3GPP) alarm notification.

Example 34 includes a method performed, for example, by an element manager, the method comprising: determining a first alarm notification, received from a wireless local area network (WLAN) access point (AP), includes an ifOperStatus object set to indicate that an operational status of an interface associated with the WLAN AP is up; determining that the first alarm notification corresponds to an active alarm in an alarm list stored at the element manager; and generating, based on determination that the first alarm notification includes an ifOperStatus object set to indicate that the operational status is up and determination that the first alarm notification corresponds to an active alarm, a second alarm notification having a notifyClearedAlarm notification type to notify an integration reference point (IRP) manager of a cellular network of a changed alarm.

Example 35 includes the method of example 34, further comprising: transmitting the second alarm notification to the IRP manager over a Type-2 interface.

Example 36 includes the method of example 34 or 35, further comprising: checking an alarm list for alarm information that corresponds to the first alarm notification; and determining that the first alarm notification corresponds to an active alarm based on said checking of the alarm list.

Example 37 includes the method of any of examples 34-36, further comprising: removing the alarm information that corresponds to the first alarm notification from the alarm list based on determination that the first alarm notification includes an ifOperStatus object set to indicate that the operational status is up.

Example 38 includes the method of any of examples 34-37, wherein the second alarm notification is to indicate a perceived severity as cleared.

Example 39 includes the method of any of examples 34-38, wherein the second alarm notification includes an identity of the WLAN AP.

Example 40 includes the method of any of examples 34-39, wherein the second alarm notification includes an alarm type of communications alarm.

Example 41 may include a method comprising receiving, by an integrated routing protocol (IRP) agent from a wireless local area network (WLAN) access point (AP), an alarm notification according to a first format; mapping, by the IRP agent the alarm notification from the first format to a converted alarm notification according to a second format to be used by an IRP manager that manages a Long Term Evolution Advanced (LTE-A) network; and transmitting, by the IRP agent, the converted alarm notification to the IRP manager.

Example 42 may include the method of example 41, wherein the IRP agent is an IRP agent of an IRP element manager (EM), and the IRP manager is an IRP manager of an IRP network manager (NM).

Example 43 may include the method of example 41 or 42, wherein the alarm notification is related to a change in an ifOperStatus object related to a condition of the WLAN AP.

Example 44 may include the method of example 43, wherein the alarm notification is related to a change in a value of the ifOperStatus object.

Example 45 may include the method of any of examples 40-44, wherein the first format is related to a WLAN format, and the second format is related to a third generation partnership project (3GPP) format, and further comprising converting, by the IRP agent, the alarm notification according to the first format to the converted alarm notification according to the second format based on the value of ifOperStatus object.

Example 46 may include the method of any of examples 40-45, wherein the alarm notification does not match with any existing active alarm at the IRP agent, and further comprising transmitting, by the IRP agent, the notifyNewAlarm notifications with severity major to IRP Manager, if ifOperStatus=down; or transmitting, by the IRP agent, the notifyNewAlarm notifications with severity minor to IRP Manager, if ifOperStatus=lowerLayerDown.

Example 47 may include the method of any of examples 40-46, wherein the alarm notification is added to an active alarm list.

Example 48 may include the method of any of examples 40-47, wherein the alarm notification matches with an existing active alarm, and further comprising transmitting, by the IRP agent, the notifyChangedAlarm notifications with severity major to IRP Manager, if ifOperStatus=down; or transmitting, by the IRP agent, the notifyChangedAlarm notifications with severity minor to IRP Manager, if ifOperStatus=lowerLayerDown; or transmitting, by the IRP agent, the notifyClearedAlarm notifications with severity cleared to IRP Manager, if ifOperStatus=up.

Example 49 may include the method of example 48, wherein the existing active alarm is removed from an active alarm list if ifOperStatus=up.

Example 50 includes an element manager having means to perform the methods any of the examples 26-49. The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. One or more non-transitory, computer-readable media having instructions that, when executed, cause an element manager to:
   determine a first alarm notification, received from a wireless local area network (WLAN) access point (AP), includes an ifOperStatus object set to indicate that an operational status of an interface associated with the WLAN AP is down;
   determine that the first alarm notification does not correspond to an active alarm in an alarm list stored at the element manager; and
   generate, based on determination that the first alarm notification includes an ifOperStatus object set to indicate that the operational status is down and determination that the first alarm notification does not correspond to an active alarm, a second alarm notification having: a notifyNewAlarm notification type to notify an integration reference point (IRP) manager of a cellular network of a new alarm; an alarm type to indicate a type of an alarm; and a probable cause indication to qualify an alarm and provide information in addition to the alarm type,
   wherein the element manager is further to access a network resource model (NRM) of the WLAN AP to determine management aspects of the WLAN AP, the NRM to include a WLAN AP information object class (IOC) that represents the WLAN AP and is contained in a managed element IOC.

2. The one or more non-transitory, computer-readable media of claim 1, wherein the instructions, when executed, further cause the element manager to: transmit the second alarm notification to the IRP manager over a Type-2 interface.

3. The one or more non-transitory, computer-readable media of claim 1, wherein the instructions, when executed, further cause the element manager to:
   check an alarm list for alarm information that corresponds to the first alarm notification; and
   determine that the first alarm notification does not correspond to an active alarm based on said check of the alarm list.

4. The one or more non-transitory, computer-readable media of claim 1, wherein the probable cause indication is to indicate a transceiver failure as probable cause of the operational status.

5. The one or more non-transitory, computer-readable media of claim 1, wherein the second alarm notification is to indicate a perceived severity as critical or major.

6. The one or more non-transitory, computer-readable media of claim 1, wherein the second alarm notification includes an identity of the WLAN AP.

7. The one or more non-transitory, computer-readable media of claim 1, wherein the alarm type is a communications alarm.

8. The one or more non-transitory, computer-readable media of claim 1, wherein the second alarm notification comprises a 3rd Generation Partnership Project (3GPP) alarm notification.

9. An apparatus comprising:
receive circuitry to receive, from a wireless local area network (WLAN) access point (AP), an alarm notification according to a first format;
mapping circuitry, coupled with the receive circuitry, to convert the alarm notification from the first format to a converted alarm notification according to a second format to be used by an integration reference point (IRP) manager to manage aspects of a cellular network, wherein the converted alarm notification is a notifyNewAlarm notification if the alarm notification includes an ifOperStatus object equal to down and the alarm notification does not match with any existing active alarm at the apparatus and the converted alarm notification includes an alarm type to indicate a type of an alarm and a probable cause indication to qualify an alarm and provide information in addition to the alarm type; and
transmit circuitry, coupled with the mapping circuitry, to transmit the converted alarm notification to the IRP manager,
wherein the mapping circuitry is further to access a network resource model (NRM) of the WLAN AP to determine management aspects of the WLAN AP, the NRM to include a WLAN AP information object class (IOC) that represents the WLAN AP and is contained in a managed element IOC.

10. The apparatus of claim 9, wherein the apparatus comprises an IRP agent and the IRP manager is an IRP manager of a network manager (NM).

11. The apparatus of claim 9, wherein the ifOperStatus object equal to down is to indicate an interface associated with the WLAN AP is not operational.

12. The apparatus of claim 9, wherein the mapping circuitry is to add the alarm notification to an active alarm list.

13. The apparatus of claim 9, wherein the transmit circuitry is to transmit the converted alarm notification to the IRP manager over a Type-2 interface.

14. The apparatus of claim 9, wherein the converted alarm notification is a notifyClearedAlarm notification if the alarm notification includes an ifOperStatus object equal to up and the alarm notification matches an existing active alarm at the apparatus.

15. The apparatus of claim 14, wherein the mapping circuitry is to remove, from an alarm list, alarm information corresponding to the alarm notification if the alarm notification includes the ifOperStatus object equal to up.

16. The apparatus of claim 9, wherein the converted alarm notification is a notifyNewAlarm notification if the alarm notification includes an ifOperStatus object equal to lowerLayerDown and the alarm notification does not match an existing active alarm at the apparatus.

17. The apparatus of claim 9, wherein the converted alarm notification is a notifyChangedAlarm notification if the alarm notification includes an ifOperStatus object equal to down and the alarm notification matches an existing active alarm at the apparatus.

18. The apparatus of claim 9, wherein the converted alarm notification is a notifyChangedAlarm notification if the alarm notification includes an ifOperStatus object equal to lowerLayerDown and the alarm notification matches an existing active alarm at the apparatus.

19. One or more non-transitory, computer-readable media having instructions that, when executed, cause an element manager to:
determine a first alarm notification, received from a wireless local area network (WLAN) access point (AP), includes an ifOperStatus object set to indicate that an operational status of an interface associated with the WLAN AP is up;
determine that the first alarm notification corresponds to an active alarm in an alarm list stored at the element manager; and
generate, based on determination that the first alarm notification includes an ifOperStatus object set to indicate that the operational status is up and determination that the first alarm notification corresponds to an active alarm, a second alarm notification having: a notifyClearedAlarm notification type to notify an integration reference point (IRP) manager of a cellular network of a changed alarm; an alarm type to indicate a type of an alarm; and a probable cause indication to qualify an alarm and provide information in addition to the alarm type,
wherein the element manager is further to access a network resource model (NRM) of the WLAN AP to determine management aspects of the WLAN AP, the NRM to include a WLAN AP information object class (IOC) that represents the WLAN AP and is contained in a managed element IOC.

20. The one or more non-transitory, computer-readable media of claim 19, wherein the instructions, when executed, further cause the element manager to: transmit the second alarm notification to the IRP manager over a Type-2 interface.

21. The one or more non-transitory, computer-readable media of claim 19, wherein the instructions, when executed, further cause the element manager to:
check an alarm list for alarm information that corresponds to the first alarm notification; and
determine that the first alarm notification corresponds to an active alarm based on said check of the alarm list.

22. The one or more non-transitory, computer-readable media of claim 21, wherein the instructions, when executed, further cause the element manager to remove the alarm information that corresponds to the first alarm notification from the alarm list based on determination that the first alarm notification includes an ifOperStatus object set to indicate that the operational status is up.

23. The one or more non-transitory, computer-readable media of claim 19, wherein the second alarm notification is to indicate a perceived severity as cleared.

24. The one or more non-transitory, computer-readable media of claim 19, wherein the second alarm notification includes an identity of the WLAN AP.

25. The one or more non-transitory, computer-readable media of claim 19, wherein the alarm type is a communications alarm.

26. The apparatus of claim 9, wherein the mapping circuitry includes one or more processors.

27. The apparatus of claim 9, wherein the transmit and receive circuitry are to communicate over a wireline or optical communication medium.

28. The one or more non-transitory, computer-readable media of claim 1, wherein the NRM is further to include an inheritance hierarchy to indicate that the WLAN AP IOC is inherited from a managed function IOC.

29. The apparatus of claim 9, wherein the NRM is further to include an inheritance hierarchy to indicate that the WLAN AP IOC is inherited from a managed function IOC.

30. The one or more non-transitory, computer-readable media of claim 19, wherein the NRM is further to include an inheritance hierarchy to indicate that the WLAN AP IOC is inherited from a managed function IOC.

\* \* \* \* \*